United States Patent

[11] 3,581,484

| [72] | Inventor | Lloyd Gilbert |
| | | Ravenna, Mich. 49451 |
| [21] | Appl. No. | 778,206 |
| [22] | Filed | Nov. 22, 1968 |
| [45] | Patented | June 1, 1971 |

[54] MACHINE FOR REPEAT HARVESTING CUCUMBERS
15 Claims, 29 Drawing Figs.

[52] U.S. Cl. .................................................. 56/327
[51] Int. Cl. ............................................. A01d 45/00
[50] Field of Search ........................................... 56/327, 126—130, 328

[56] References Cited
UNITED STATES PATENTS

| 2,829,484 | 4/1958 | Gilbert | 56/327 |
| 2,893,193 | 7/1959 | Gilbert | 56/327 |
| 3,365,869 | 1/1968 | Whiteley | 56/327 |
| 3,386,236 | 6/1968 | Mitchell | 56/327 |
| 3,416,298 | 12/1968 | Erdman | 56/327 |
| 3,427,794 | 2/1969 | Burton | 56/327 |
| 3,466,859 | 9/1969 | Humphries | 56/327 |

*Primary Examiner*—Russell R. Kinsey
*Attorney*—Glenn B. Morse

ABSTRACT: A machine constructed to move a picking mechanism underneath rooted cucumber vines, and remove the cucumbers in excess of a selected size through a rotary grasping action. The vines are repositioned on the ground undamaged as the machine proceeds along a row.

INVENTOR.
Lloyd Gilbert
ATTORNEY

INVENTOR.
Lloyd Gilbert

INVENTOR.
Lloyd Gilbert
BY
ATTORNEY

INVENTOR.
Lloyd Gilbert

ATTORNEY

Fig. 29

MACHINE FOR REPEAT HARVESTING CUCUMBERS

BACKGROUND OF THE INVENTION

The machine harvesting of cucumbers has developed along two different lines. One of these involves the severing of the vines from the roots, and the subsequent stripping of all of the fruit from the vines. In this procedure, the vines are discharged as trash after the stripping has been completed. Special varieties of cucumbers have been developed to utilize this procedure by coming into harvesting condition all at once. The other harvesting system removes the cucumbers from the vines without damage to the vines, and this process is practiced repeatedly during an extended harvesting season. Examples of this type of machine appear in my U.S. Pat. Nos. 2,829,484 and 2,893,193. The advantage of the repeat harvesting procedure includes the picking of fruit at a more controlled size, and a normal increase in harvested yield per acre. The principal problem encountered in the design of a repeat harvester is in the removal of the cucumbers from the vines with minimal damage and a maximum percentage of recovery.

SUMMARY OF THE INVENTION

A significant feature of the present invention is in the mechanism for picking the cucumbers from the vines. A portion of the machine is constructed to move underneath the vines as the machine proceeds along a row. The cucumbers depending from the vines passing over this portion of the machine are grasped by a rotary unit provided with projections extending from the axis of rotation, these projections being spaced by an amount corresponding to a selected size of cucumber which is to be the minimum removed at that particular picking operation. Cucumbers smaller than this selected size will remain on the vine to grow, and be harvested at a later occasion. Repeat harvesting is not a new concept, and is repeated at whatever frequency is considered appropriate to recover cucumbers within a predetermined range of size.

In the preferred form of the invention, the rotary picking member has a series of pairs of axially spaced projections, with a wall formation extending on either side of the space between the projections to form a peripherally convergent space tending to lead the cucumbers into the entrapment provided by the space gap. This produces a helical configuration of the wall, and results in leading the cucumbers into the grasping area so that a given pair of picking projections will have the effect of sweeping a very substantial space on either side of the actual point of grasping the fruit. The axial sequence of the pairs of picking projections are preferably incorporated in a rotating shaft mounted on an axis which is generally horizontal, and skewed slightly to one side, with respect to the direction of movement of the harvesting machine over the ground. The picking mechanisms are also preferably repeated on either side of a gap which is sufficient to accept the root structure of the vines, so that one of the picking devices is disposed on each side of the row of vine roots, the vines being arranged to lie laterally along the ground from the point of connection to the roots. As the machine moves along the row, the vines are gently elevated and carried to the picking station, and are then replaced on the ground undamaged for subsequent harvesting. Cucumbers removed by the picking mechanism are deposited gently on a conveyor, with such a short fall as to practically eliminate any danger of damage or abrasion.

The picking mechanism, with its associated conveyor system, is preferably mounted as an independent unit on the primary frame of the machine. The form of mounting provides a vertical freedom of movement so that the picking mechanism is free to adjust itself to the ground over which it moves. The preferred form of this mounting involves a double linkage arrangement, with the frame of the machine having components that are adjustable so that the relationship of the pivotal connections of the links to the horizontal can be altered to induce a change in the horizontal attitude (inclination, or "pitch"), and also includes a provision for forcibly rotating the links to elevate the picking devices out of ground contact for freedom of movement of the vehicle along a roadway.

Since the preferred form of the invention provides for the picking of a number of rows at the same time, the lateral span of such a machine becomes extensive. To facilitate movement over a highway, or between various positions in a field preparatory to proceeding along a harvesting operation, provision is made in the preferred form of the machine to establish a position of the ground-support wheels approximately 90° about a vertical axis with respect to the normal position taken by the wheel system during the harvesting movement. The machine is thereby arranged to present its narrower dimension (front to rear) for movement down a highway, which makes it possible for the machine to be transported over substantial distances without disassembly.

The several features of the invention will be analyzed in detail through a discussion of the preferred embodiment illustrated in the accompanying drawings. In the drawings.

DESCRIPTION OF THE PREFERRED EMBODIMENTS

Picking Mechanism

Figures 1, 2, 3:
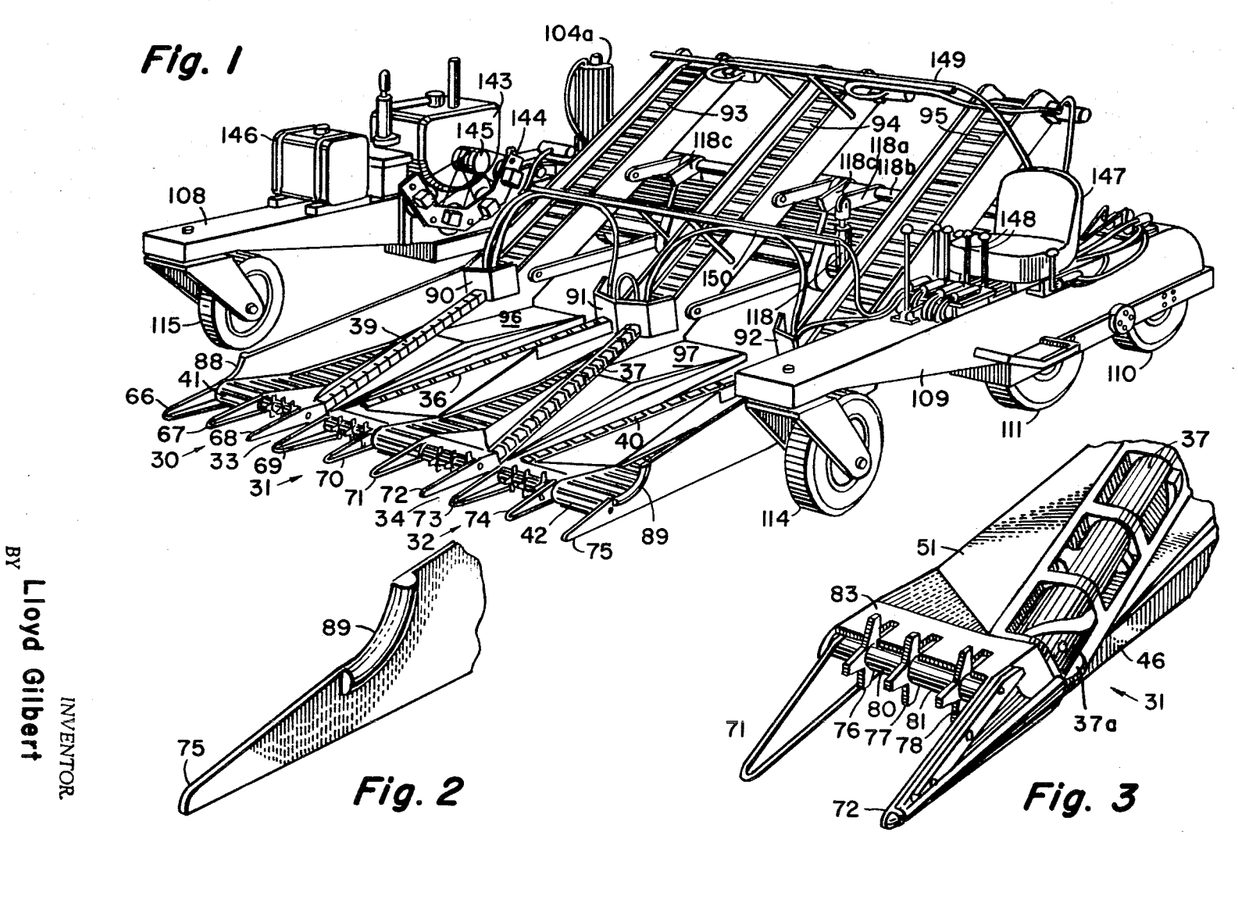
FIG. 1 is a perspective view from the front quarter of a machine adapted to pick two rows at once. The machine is arranged for harvesting action.
FIG. 2 is an enlarged perspective view showing the leading portion of a side plate of one of the vine-engaging sections of a picking mechanism.
FIG. 3 is an enlarged perspective view showing the leading portion of that part of the vine-engaging structure that first encounters the vines, and begins the picking action.
Figure 4:
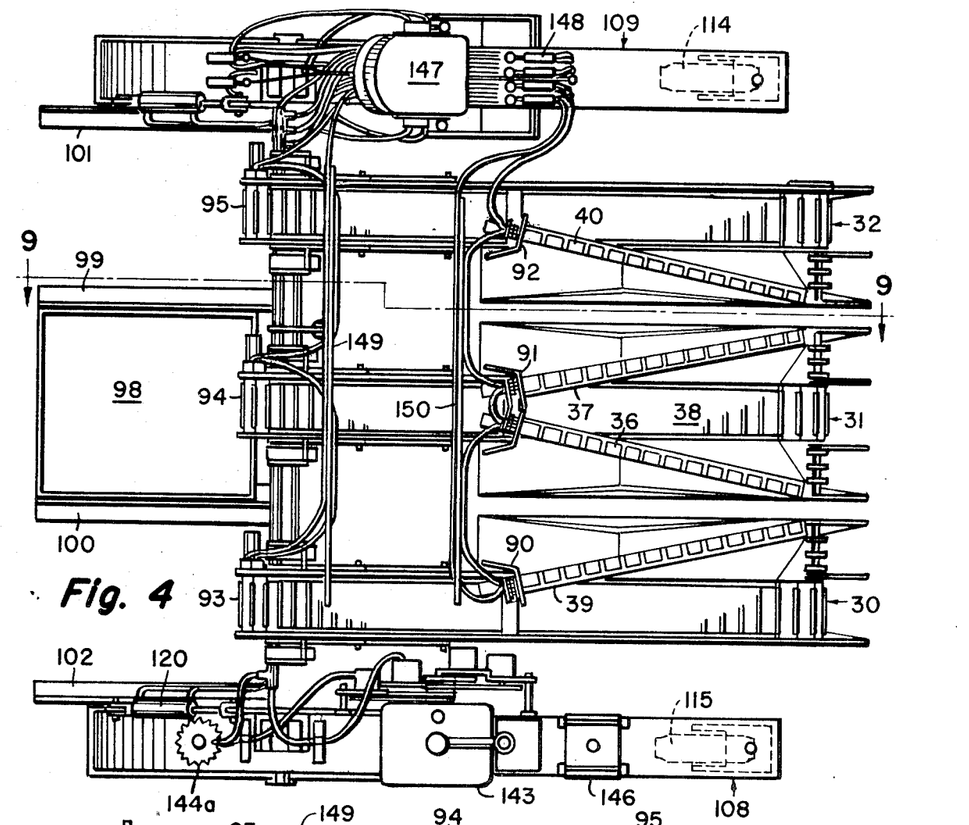
FIG. 4 is a plan view of the machine illustrated in FIG. 1.
Figure 5:
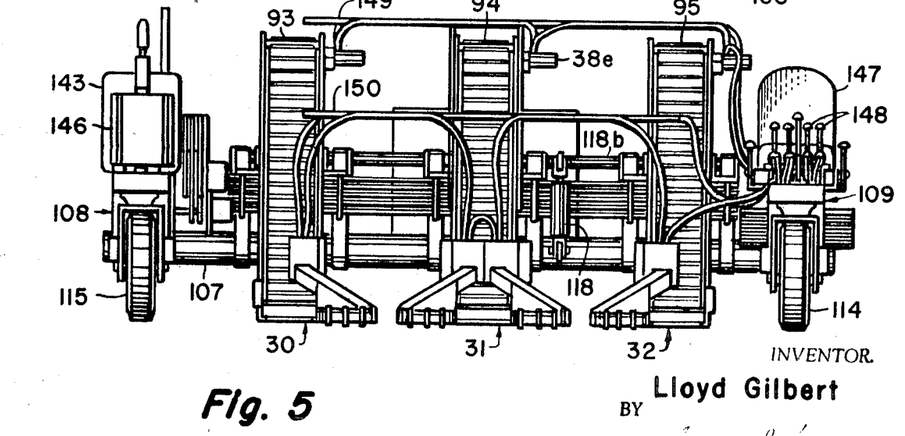
FIG. 5 is a front view of the machine illustrated in FIG. 1.
Figure 6:
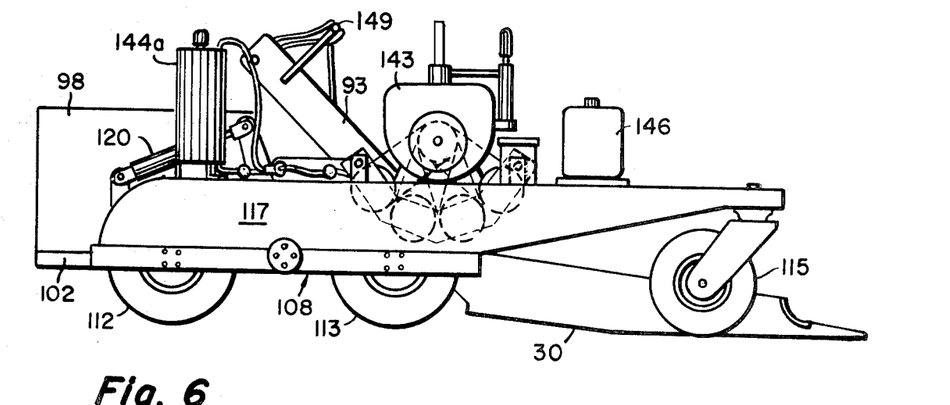
FIG. 6 is a side elevation of the machine illustrated in FIG. 1.
Figure 7:
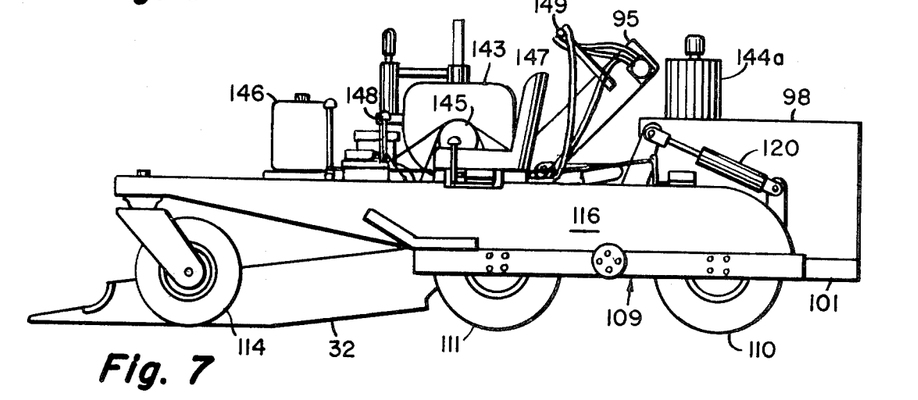
FIG. 7 is an opposite side elevation of the machine shown in FIG. 1.
Figure 29:
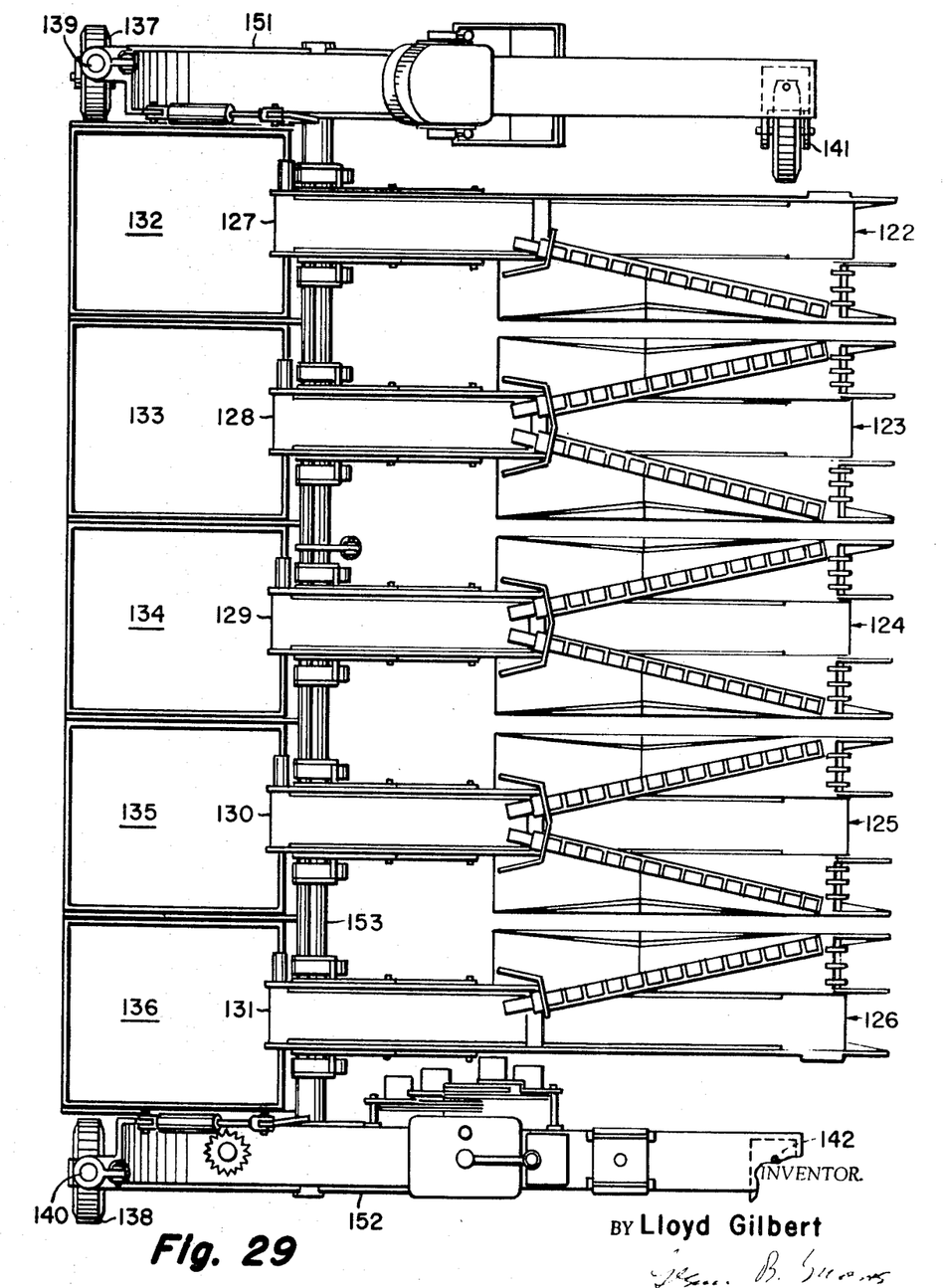
FIG. 29 is a plan view of a four-row picking machine, with its ground-supporting system arranged for movement along a highway.

The machines illustrated in FIGS. 1 and 29 have the primary function of moving a group of vine-engaging sections, as shown at 30—32 in FIG. 1, underneath cucumber vines as the machine moves along the rows. The rows are planted in carefully spaced relationship to accommodate machine harvesting, and the vine-engaging sections are spaced as shown at 33 and 34 in FIG. 1 so that the portions of the plant adjacent the roots can pass through without disturbance. The vines are trained laterally outward from the row, usually at predetermined angles, and the FIG. 1 machine is adapted to harvest along two rows at the same time. The FIG. 29 arrangement will accommodate four rows.

Each of the sections 30—32 is independently mounted on the frame of the machine with a limited degree of freedom of vertical movement. The weight of the sections is supported on the ground-engaging surfaces 35, which function as bearing shoes sliding along the ground as the machine moves forward. The central section 31 has one side adapted to receive the vines on one side of one row, and the opposite side to receive one side of the adjacent row. The outer sections 30 and 32 correspond to one side of the central section 31. The details of all of the vine-engaging sections of the machine are similar, and the structure to be described in connection with FIGS. 12-—20 will apply generally to the other sections of the machine, with the exception of the right-hand left-hand differences, and the fact that the central section 31 has a pair of rotary picking members 36 and 37 delivering to a single central collecting conveyor 38, while the outer sections 30 and 32 have single rotary picking members 39 and 40 delivering the fruit to the associated conveyors 41 and 42, respectively.

Each of the vine-engaging sections has a boxlike sheet metal structure for establishing the necessary rigidity to maintain its configuration. This structure includes the bottom sheet 43 (providing the surface 35), the longitudinal walls 44—47, and the top plates 48 and 49. These top plates provide recesses for the picking members 36 and 37, respectively, and also the slanted surfaces 50 and 51 which conduct the fruit removed from the vines over to the central conveyor 38.

Figures 12, 13, 14, 15:
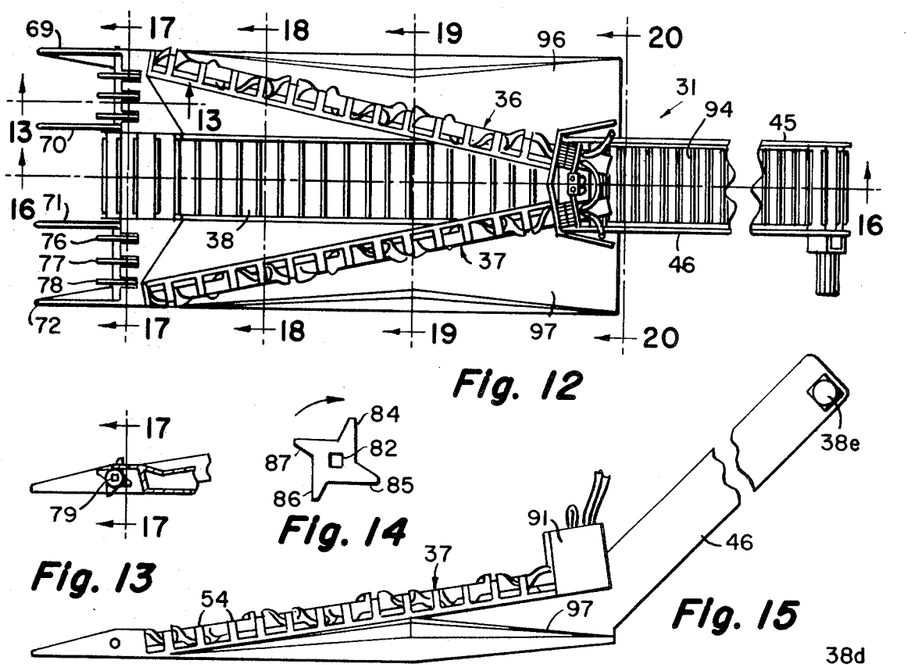
FIG. 12 is a plan view on an enlarged scale over that of FIG. 1, showing the vine-engaging structure and the rotary picking and conveying sections.
FIG. 13 is a section on the plane 13—13 of FIG. 12.
FIG. 14 is an enlarged view of the rotating forward member responsible for initially picking up and urging the vines to the rear.
FIG. 15 is a side elevation of the unit shown in FIG. 12.
Figures 16, 17, 18, 19, 20:
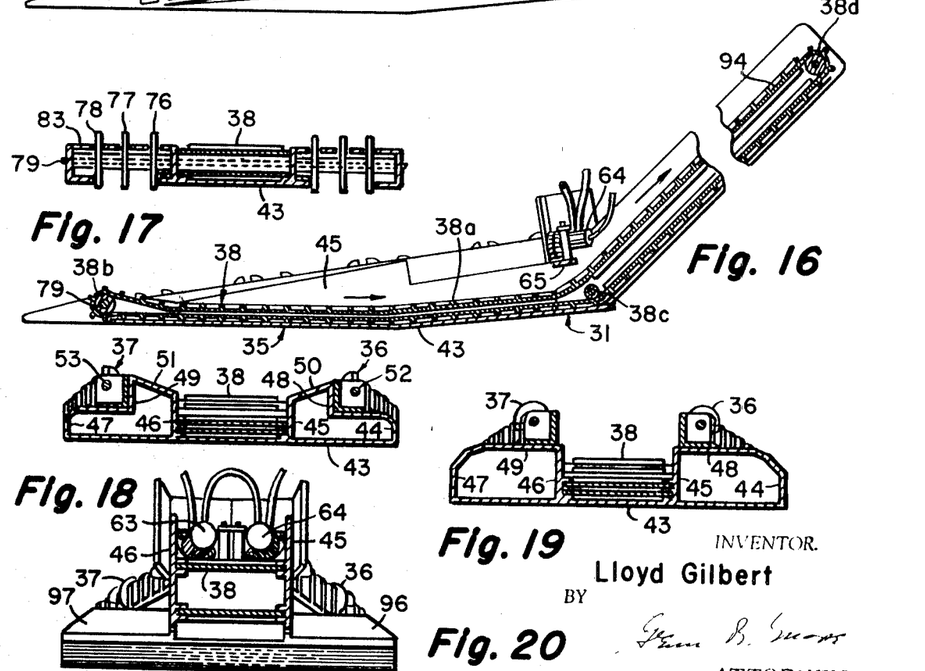
FIG. 16 is a section on the plane 16—16 of FIG. 12.
FIG. 17 is an enlarged section on the plane 17—17 of FIG. 12.
FIG. 18 is an enlarged section on the plane 18—18 of FIG. 12.
FIG. 19 is an enlarged section on the plane 19—19 of FIG. 12.
FIG. 20 is an enlarged section on the plane 20—20 of FIG. 12.
Figures 21, 22, 23, 24, 25, 26, 27, 28:
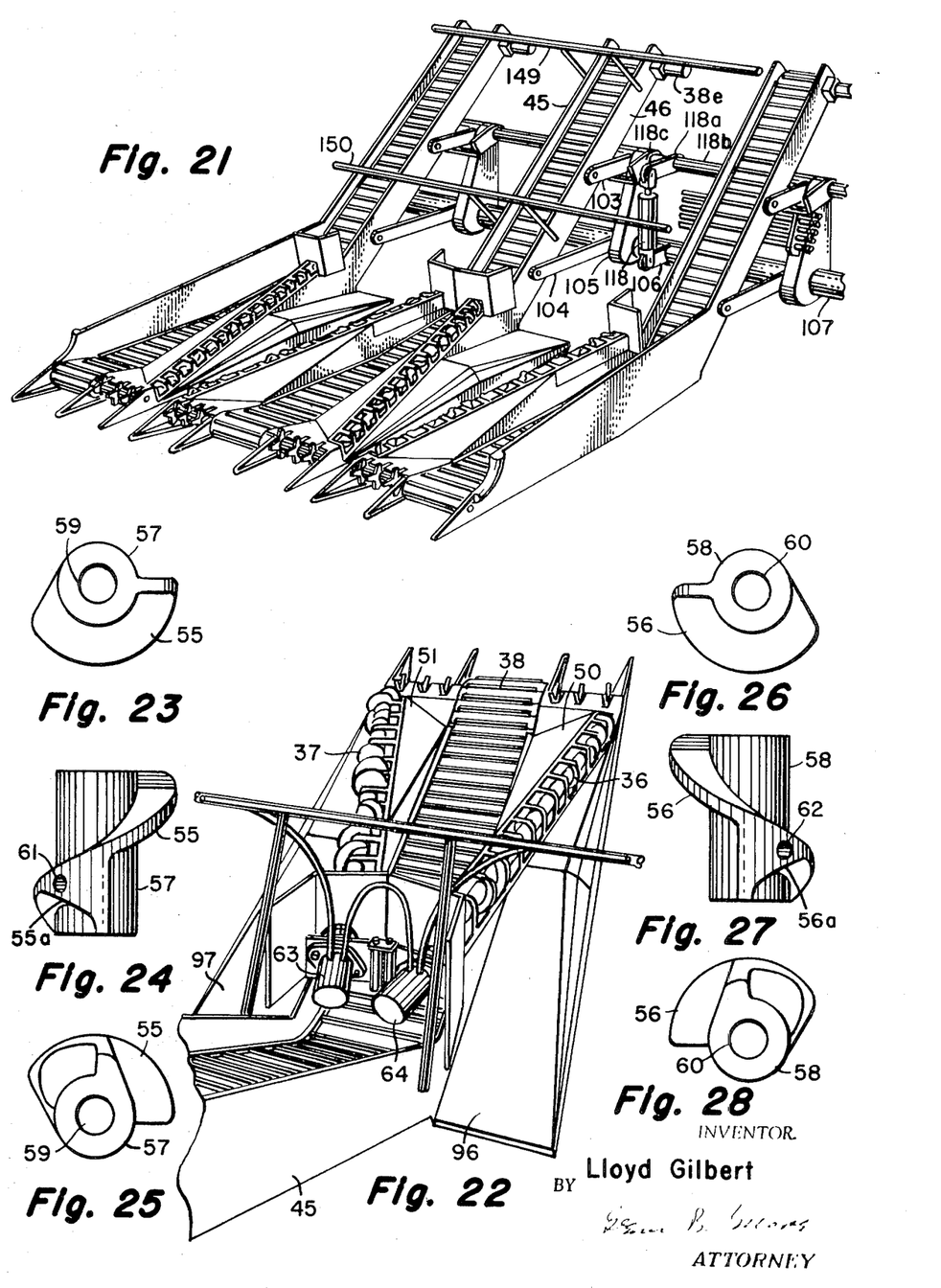
FIG. 21 is a perspective view on an enlarged scale over that of FIG. 1, showing the group of picking devices with the general frame of the machine removed.
FIG. 22 is an enlarged perspective view from above, looking toward the front, illustrating primarily the drive arrangement for the picking devices.
FIG. 23 is an enlarged view of one of the elements of a picking unit.
FIG. 24 is a plan view of the member shown in FIG. 23.
FIG. 25 is an opposite end view with respect to FIG. 23.
FIG. 26 is an end view of an opposite picking element used in conjunction with the FIG. 23 element to constitute a pair of picking members.
FIG. 27 is a plan view of the element shown in FIG. 26.
FIG. 28 is an opposite end view with respect to that shown in FIG. 26.

The picking action is produced by a group of elements secured to the shafts 52 and 53 rotatably mounted in suitable supports as shown at 54 in FIG. 15 on the recessed portions of the top plates 48 and 49. The configuration of these elements is best shown in FIGS. 23—28. The elements each have a helical projecting wall as shown at 55 and 56 extending from the hub portions 57 and 58 provided with the holes 59 and 60 for receiving the shafts 52 and 53, respectively. The walls have portions 55a and 56a arranged in helices of respectively opposite hand, which produces peripherally converging spaces between the elements leading into the gaps opposite the supports 54, which function as axial spacing for the picking elements. The direction of rotation of the units 36 and 37 is such that the top portion moves toward the central conveyor 38. This direction of rotation determines the arrangement of the helices of the walls 55 and 56 such that the convergence between them is properly oriented. The spacing between the picking elements by the thickness of the supports 54 is selected to correspond to the minimum width of a cucumber which is to be removed from the vines. The elements are locked in the desired position on their respective shafts by setscrews engaging the holes 61 and 62, shown in FIGS. 24 and 27. The action of the picking elements is supplemented by the rubber projections 37a on the first elements, which flips small cucumbers near the root into picking position. The rotary members which include the various pairs of picking elements, and their respective shafts, are driven by the hydraulic motors 63 and 64 mounted on suitable bracket structure 65 secured to the walls 45 and 46.

As the sections 30—32 are progressively shoved under the vines of the rows being harvested by the machine, the first encounter with the vines takes place at the lifting points 66—75. These rounded points elevate the vines gently to a position in which the spoked members shown in FIG. 14 can function somewhat like a lifting fork. These members, shown at 76—78 in FIG. 3, are grouped on the same shaft 79 that determines the end of the associated conveyor. The elements are separated on the shaft by spacing collars 80 and 81, and it is preferable that the portion of the shaft 79 receiving the members 76—78 be square (or otherwise noncircular) in cross section to register with the central holes 82 in driving relationship. A comb plate 83 is mounted on the top of the section between the sidewalls 45 and 46, and is provided with slots for receiving the projecting lines 84—87, which are slanted from a true radius to cause a tendency for the plate 83 to move the vines out of engagement with the tines. This action produces a continued gentle lifting and rearward-inducing force on the vines to move them into engagement with the rotary picking members 36 and 37. Since there will inevitably be come degree of overlap between the vines of adjacent rows, it is desirable to permit the vines outside the rows being harvested to be withdrawn from the machine as gently as possible to avoid damage. The arcuate recesses defined by the rounded surfaces 88 and 89 on the outer lifting point members 66 and 75 are provided for this purpose.

Figure 8:
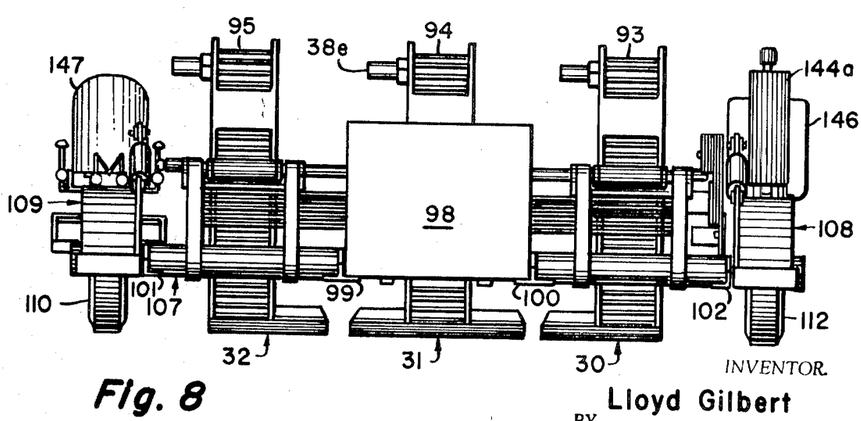
FIG. 8 is a rear view of the machine shown in FIG. 1.

The vines move to the rear with respect to the machine, as a result of the combined action of the forward movement of the machine over the ground, together with the lifting action of the groups of members 76—78. This movement brings the vines under the influence of the rotary picking mechanism. The axis of rotation of these members is skewed laterally somewhat from a predominately front-rear direction in order to sweep effectively the full lateral extent of the vines. Preferably, these members are also inclined somewhat from a lower position at the leading portion to a slightly elevated position at the rear. This angle of inclination is best shown in FIG. 15, and serves the function of processing the vines at various distances above the ground in order to engage the depending cucumbers that may be at any position within the vertical height of the foliage. As the portions of the vines near the roots move into the spaces 33 and 34, the laterally extending portions of the vines are progressively dragged over the picking units on each side of the rows. This action continues until the vines encounter the shields 90—92 at the juncture between the collecting portions of the conveyor and the inclined elevating portions 93—95. The vines then move down the inclined surfaces indicated at 96 and 97 in FIG. 1, associated with each of the picking sections, and are gently deposited on the ground between the elevating conveyor sections 93—95. This vine movement takes place against the rotary action of the picking members; and as the movement proceeds, the depending cucumbers are progressively entrapped between the elements of the picking members and are plucked from the vines. They then roll down the inclined surfaces 50 and 51 on to the associated conveyor, which then moves the fruit from the generally horizontal collecting portions up along the elevating portions 93—95, from which they are dropped into a receiving bin shown at 98, which rests on the rearwardly extending fork members 99 and 100. These forks have oppositely extending flanges, for receiving similar bins in conjunction with the fork members 101 and 102 opposite the ends of the elevating conveyors 93 and 95, respectively. The conveyor system is preferably a continuous belt 38a positioned by the front roller 38b, the junction roller 38c, and the rear roller 38d driven by the hydraulic motor 38e (shown in FIG. 8).

Mounting of the Picking Mechanism on the Machine

Figure 9:
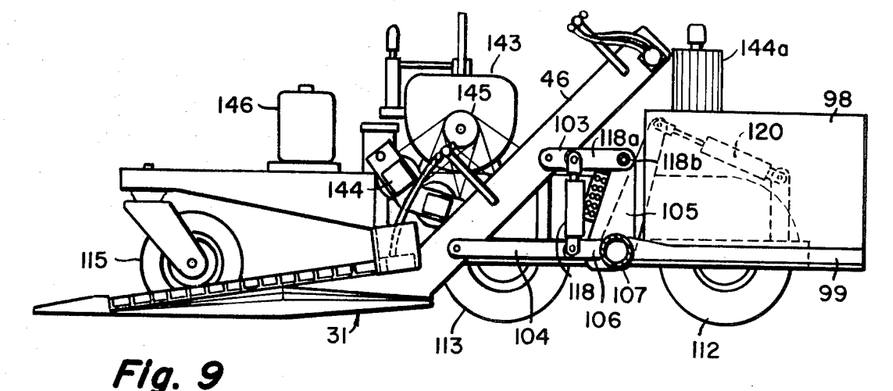
FIG. 9 is a sectional view on the plane 9—9 of FIG. 4, illustrating the normal operating condition and position of the picking units and the support structure for the collection bin.
Figure 10:
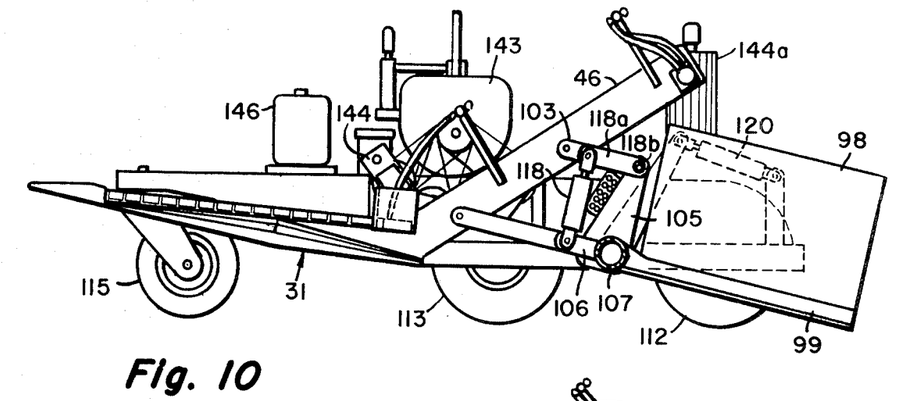
FIG. 10 illustrates the shift in position of the picking mechanism, and also that of the support for the collection bin, in response to movement of the frame elements, preparatory to depositing the bin on the ground.
Figure 11:
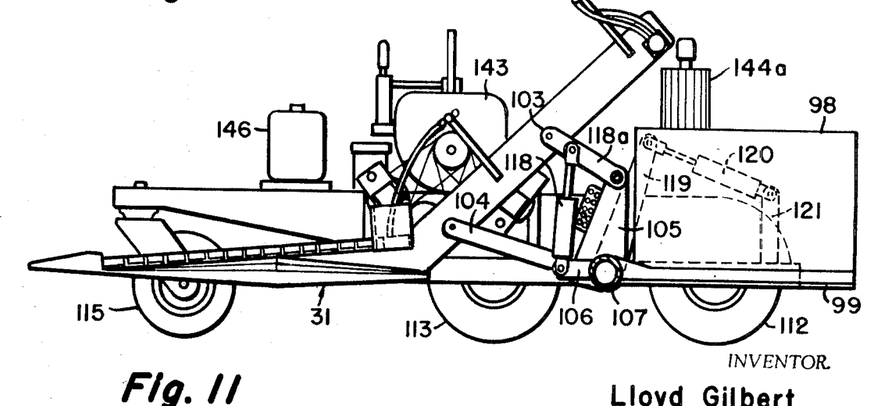
FIG. 11 illustrates the position of the components preparatory to moving the device over the ground, as when aligning it for movement down a row. This figure shows the picking mechanism elevated out of ground contact.

The arrangement for supporting the picking mechanism on the body structure of the machine is best shown in FIGS. 9, 10 and 11. The continuity of the side plates 45—46 provides a beam of angular configuration, as seen in profile, which has sufficient rigidity to permit the entire picking mechanism, including the elevating conveyor sections, to be handled as a unit from practically any point on the entire assembly. A pair of links 103 and 104 are connected to each of the side plates 45 and 46 of the elevating conveyor sections, and the opposite ends of these links are secured to arms shown at 105 and 106 secured to the tubular transverse member 107 extending between the carriage assemblies 108 and 109 on the opposite sides of the machine. Each of these carriage assemblies includes a tandem arrangement of driving wheels 110—111 and 112—113, together with a steerable wheel as shown at 114 and 115. Each of the carriage assemblies has a boxlike sheet metal chassis, as shown at 116 and 117, and these units, together with the transverse tubular member 107 interconnecting them, may be considered as constituting the main "-frame" of the machine.

In normal use, the picking units are ground supported on the under surfaces of the vine-engaging sections, but may be elevated out of ground contact by the action of the hydraulic cylinder 118 extending from a arm 106 to an arm 118a on the shaft 118b. This shaft is rotatably supported on the arms 105, and provides the pivotal connection for the links 103. The shaft 118b has arms 18c extending adjacent the links 103, and these arms each have an axially extending member (not shown) disposed to intercept the links 103 in an upward direction. When the cylinder 118 is relaxed, the links 103 are free to move vertically; but when the cylinder 118 is extended, the links (and the associated picking mechanisms) are supported in the FIG. 11 position. FIG. 11 illustrates the manner in which the application of hydraulic pressure to extend the cylinder 118 will induce upward rotation of the links 103, and thus elevate the mechanisms out of ground engagement. The machine is then in condition to move across a field to or from alignment with the rows of vines.

This form of mounting of the picking mechanisms makes possible another degree of adjustability, which facilitates the handling of the collecting bins 98. The fork tines 99—102 are all secured directly to the member 107, which is also provided with the arms 119 at its opposite ends. The entire tubular member 107 is rotatable with respect to the carriage assemblies 108 and 109, and the actuation of the cylinders 120 (extending from the arms 119 to the arms 121 on the carriage assemblies) will induce such rotation of the member 107 as to move the forks from the horizontal position shown in FIG. 9 to a downward-rearward inclined position shown in FIG. 10. Particularly when the bin 98 is full, a lowering into the FIG. 10 position will permit the ground resistance to drag the full bin off and out of engagement with the forks as the machine moves ahead. An empty bin is then easily placed in engagement with the forks, either by sliding it up into position or by lifting it directly in place when the forks are in FIG. 9 position. Since this movement of the transverse member 107 also induces a rotation of the arms 105 and 106, the attitude of the picking mechanisms is necessarily altered about a transverse horizontal axis from the position shown in FIG. 9 to that of FIG. 10. This increase in the pitch of the sliding surface of the vine-engaging sections is useful under some conditions, as a relaxing of the cylinder 118 will then permit the picking mechanism to engage the ground in an attitude of increased pitch.

General Assembly Features

The adaptability of the machine to pick a number of rows at the same time is utilized most fully by the arrangement shown in FIG. 29. In that machine, the picking devices 122—126 deliver the harvested crop off the ends of the elevating conveyors 127—131 into the collecting bins 132—136. This number of simultaneous picking operations produces a very considerable lateral dimension, with respect to the direction of movement of the machine (which is from left to right, as viewed in FIG. 29). It is often desirable to move a machine of this type down a highway, in order to go from one field to another, or from field work to a place of storage. It is obvious that the FIG. 29 configuration produces a narrower dimension from left to right than from one side carriage assembly to the other. To accommodate movement down a highway, the auxiliary wheels 137 and 138 are mounted for vertical movement under control of the hydraulic cylinders 139 and 140, respectively. These cylinders can be operated to move the associated wheels downward to the point where the carriage assemblies are lifted off of the normal driving wheels, so that they are then supported by the wheels 137 and 138 and by the steerable wheel units 141 and 142. These can be rotated about a vertical axis by an amount in excess of 90°, with the result that the downward actuation of the cylinders 139 and 140 will produce a condition in which the machine is capable of moving sideways with respect to its normal path of harvesting motion, or in the direction from top to bottom, as appearing in FIG. 29. Suitable hydraulic motors (not shown) are associated with the wheels 137 and 138 to provide power. Similar motors are also associated with the normal driving wheels 110—113. While it is possible to swivel the wheels 110—113 about a vertical axis to a transverse position, such an arrangement complicates the structure of the carriage assemblies to the point that the arrangement shown in FIG. 29 is preferred.

The carriage assembly 108 preferably includes the gasoline or diesel motor 143 driving a battery of fluid pumps generally indicated at 144. Belt or chain drives from the motor sprocket 145 transfer power over to the pump units 144. A fuel tank 146 may be mounted as shown. The opposite carriage assembly 109 is preferably used for the driver's station, indicated by the seat 147. The various controls indicated at 148 are primarily valves, or valve actuators, connected by conventional conduit circuitry (shown only partially in the drawings) to the various actuating cylinders and motors. It is significant, however, that the operating oil under pressure from the motors 144 is lead across the machine by the collections of conduits indicated at 149 and 150 to the valve assembly at the driver's station, and from there back to the various hydraulic units being controlled. The effect of this arrangement is to provide a cooling action to the hydraulic fluid, which often becomes heated to a very considerable degree by the action of the hydraulic motors and the throttling involved in passing through the various points of constriction in the system. With a unit the size of that shown in FIG. 29, this cooling action attributable entirely to the length of the conduits can have an effect equal to that of a very substantial radiator. This cooling action is augmented by the use of a finned oil reservoir 144a associated with the pumps 144. A tank of this sort functions as a heat exchanger, as the return lines are connected to it.

Particularly in the larger units of this type, it should be noted that the rotatability of the carriage assemblies 108—109 and 151—152 with respect to each other about the tubular interconnecting member 107 or 153 will have the effect of eliminating a tremendous amount of tortional strain which would be involved if any attempt were made to produce a nonresilient chassis of such dimensions. The entire machine, because of the ability of the various components to articulate with respect to each other, is thus able to withstand continuous use over very rough terrain without undue strain.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A machine for harvesting cucumbers, said machine having: a frame, ground-engaging means on said frame for supporting said machine, and adapted to establish a normal direction of movement thereof; and picking means secured to said frame, and including at least one vine-engaging section adapted to pass underneath cucumber vines at one side of the root thereof, wherein the improvement comprises:

a rotary member mounted on said vine-engaging section for rotation on an axis adjacent ground level, said rotary member having at least one pair of axially spaced projections, the spacing between said projections being selected to receive a cucumber stem, but prevent the passage of a cucumber of a predetermined width, whereby rotation of said member removes a cucumber depending from a vine, in excess of said width, when the stem thereof has entered the space between said projections;

driving means for rotating said member; and conveying means having a collecting portion thereof mounted on said section, and disposed to receive cucumbers removed from vines by said rotary member, said conveying means being adapted to carry the said cucumbers to an accumulating station.

2. A machine as defined in claim 1, wherein said rotary member axis is disposed in a primarily front-rear direction with respect to the direction of movement of said machine.

3. A machine as defined in claim 1, wherein said axis is disposed with a transverse directional component, with respect to the said direction of movement of said machine.

4. A machine as defined in claim 1, wherein said projections define a peripherally converging space therebetween, with the narrowest part thereof disposed behind the wider portions thereof, with respect to the direction of rotation of said rotary member.

5. A machine as defined in claim 1, wherein said rotary member is provided with a group of said pairs of projections in axial sequence.

6. A machine as defined in claim 1, wherein said machine has laterally spaced vine-engaging sections, said sections being secured to said frame for relative articulation.

7. A machine as defined in claim 6, wherein said sections are provided with rotary members driven in a direction such that the upper portions thereof move, at least in part, laterally away from the space between said sections, and said members of each of said section are disposed between said space between said sections and the conveying means of the respective section.

8. A machine as defined in claim 1, wherein said section has a ground-engaging surface, and is connected to said frame for relative vertical movement with respect thereto.

9. A machine as defined in claim 1, wherein said conveying means has an elevating portion communicating with said collecting portion, at least said collecting portion being disposed in a front-rear direction with the conveying course thereof moving rearwardly with respect to the direction of movement of said machine, said conveying means having a vine shield ahead of the junction of said conveying means portions to induce lateral movement of vines away from said elevating portion.

10. A machine as defined in claim 1, wherein said frame has a member rotatable about a transverse horizontal axis, and including vertically spaced link means connecting said vine-engaging section to said frame member.

11. A machine as defined in claim 10, wherein said frame has means limiting the downward rotation of at least one of said link means with respect to said frame member, and said machine includes an actuator for rotating said frame member.

12. A machine as defined in claim 10, wherein said machine includes actuating means for inducing upward rotation of at least one of said link means.

13. A machine as defined in claim 11, wherein said frame member is provided with means forming a rearwardly extending container support.

14. A machine as defined in claim 6, wherein said machine has a plurality of laterally grouped pairs of spaced vine-engaging sections, and said ground-engaging means includes wheel means operable in a position displaced 90° about a vertical axis from the position corresponding to the normal direction of movement of said machine.

15. A machine as defined in claim 1, wherein said pair of projections are formed by separate members adjustably mounted on a shaft.